Jan. 28, 1958     C. P. GALANOT     2,821,443
TRACTION DEVICE FOR A VEHICLE WITH TIRES OR THE LIKE
Filed July 16, 1956     4 Sheets-Sheet 1
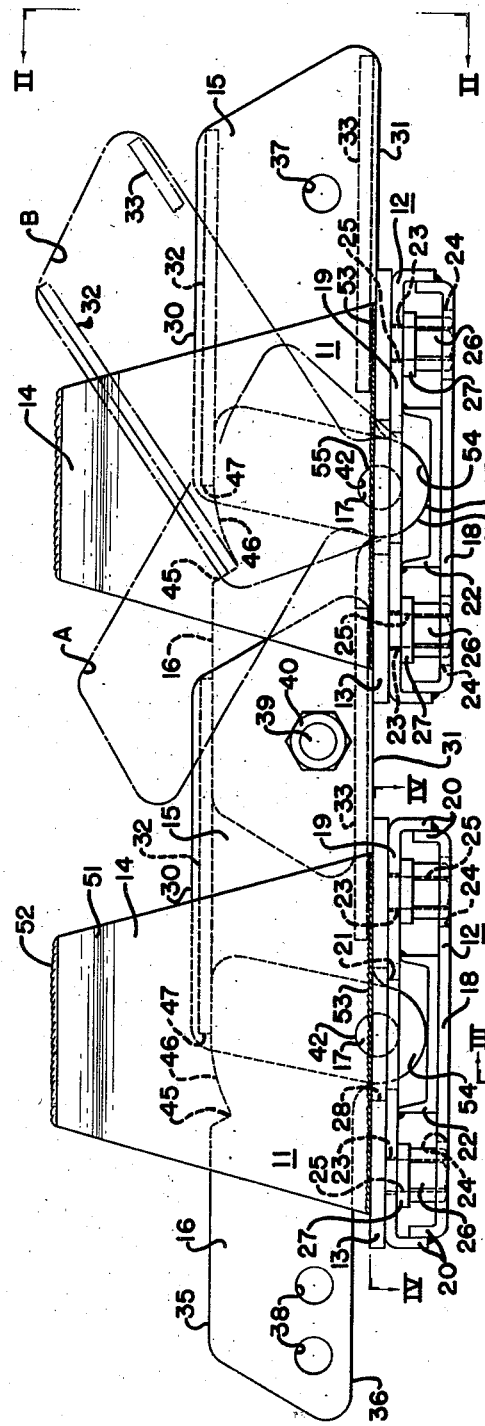
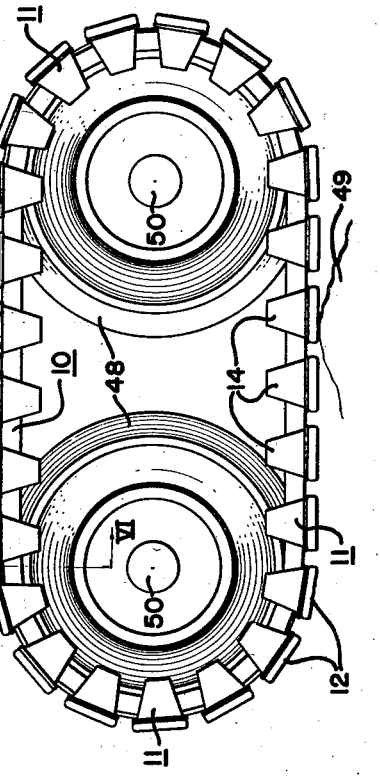
INVENTOR.
CAMILLE P. GALANOT Jan. 28, 1958   C. P. GALANOT   2,821,443
TRACTION DEVICE FOR A VEHICLE WITH TIRES OR THE LIKE
Filed July 16, 1956   4 Sheets-Sheet 2
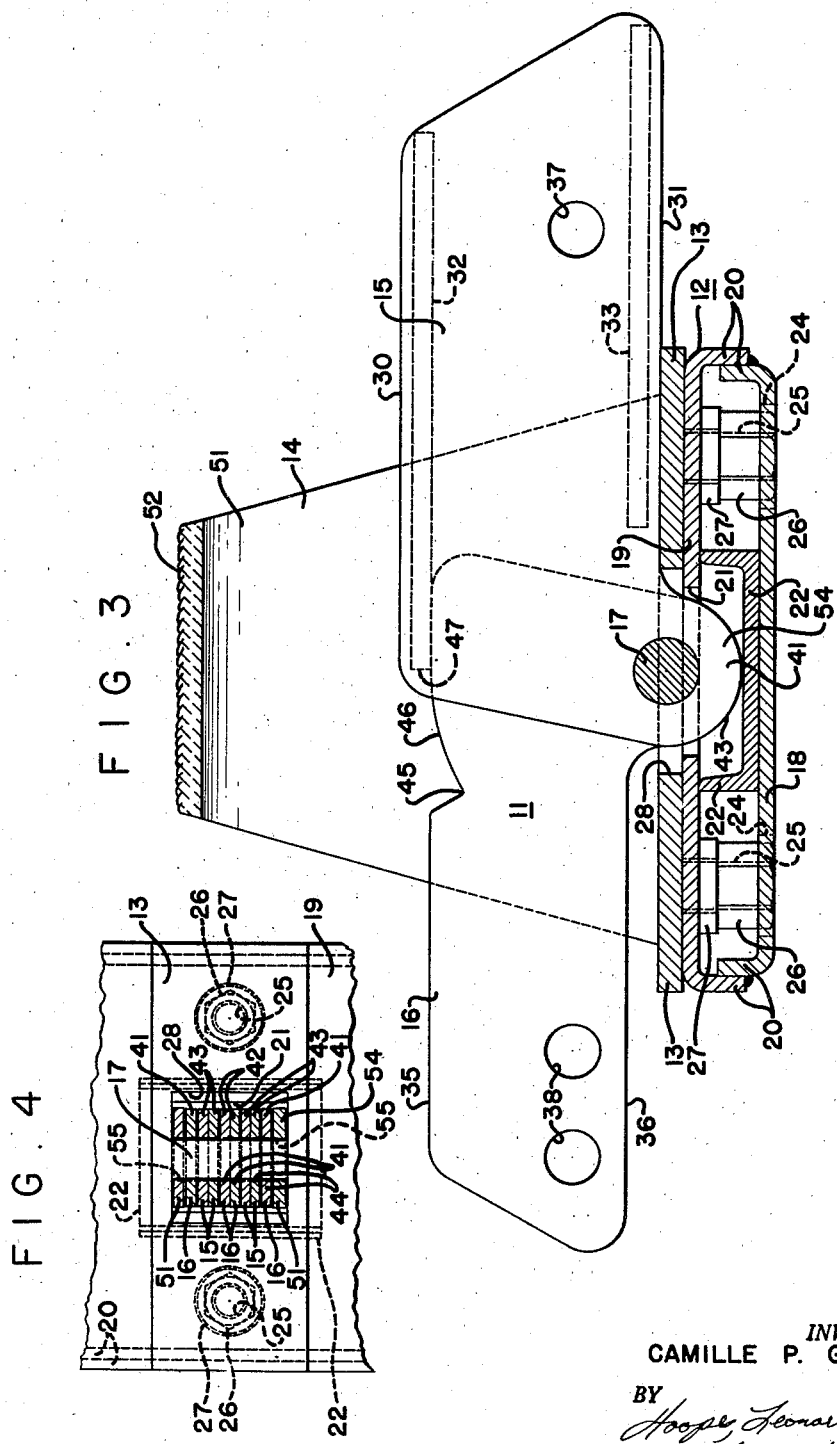
INVENTOR.
CAMILLE P. GALANOT Jan. 28, 1958 C. P. GALANOT 2,821,443
TRACTION DEVICE FOR A VEHICLE WITH TIRES OR THE LIKE
Filed July 16, 1956 4 Sheets-Sheet 3

INVENTOR.
CAMILLE P. GALANOT
BY
his attorneys

Jan. 28, 1958 C. P. GALANOT 2,821,443
TRACTION DEVICE FOR A VEHICLE WITH TIRES OR THE LIKE
Filed July 16, 1956 4 Sheets-Sheet 4
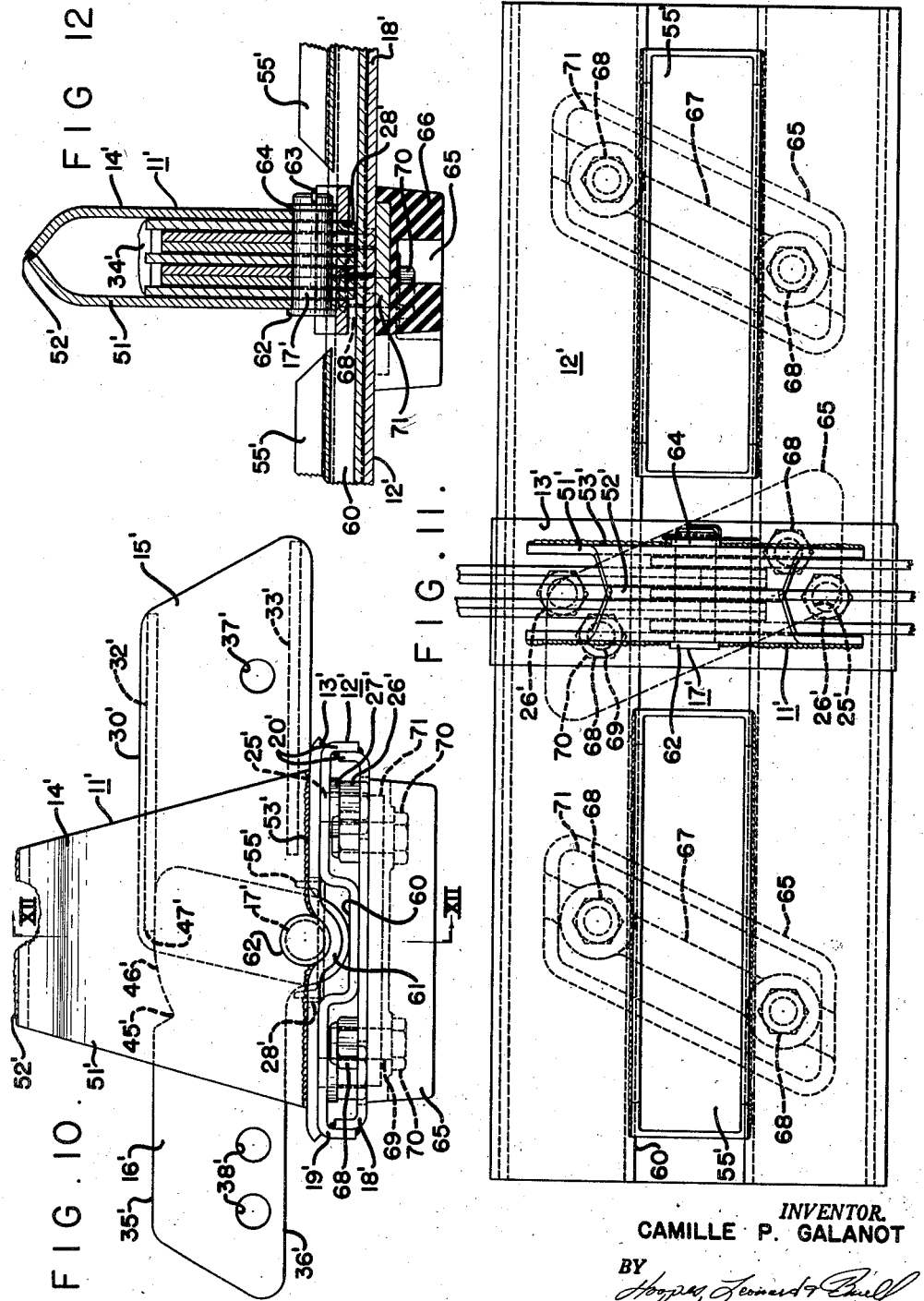
INVENTOR.
CAMILLE P. GALANOT
BY

United States Patent Office 2,821,443
Patented Jan. 28, 1958

2,821,443

TRACTION DEVICE FOR A VEHICLE WITH TIRES OR THE LIKE

Camille P. Galanot, Alliance, Ohio

Application July 16, 1956, Serial No. 598,198

10 Claims. (Cl. 305—10)

This invention relates to new traction devices for a vehicle with tires or the like and to interchangeable units for such devices. More particularly, this invention pertains to such traction devices in which such units, preferably preassembled, are connected together in endless order around vehicle wheels or the like to enable such vehicles to have traction under all conditions such as those occurring in going over raw and plowed lands, marshy and wet areas, snow fields and banks and/or sand and desert locations.

Traction devices and units therefor made in accordance with my present invention are an improvement upon illustrated embodiments set forth in my prior copending application Serial No. 328,923, now Patent No. 2,755,146 filed December 31, 1952. Traction devices made hereunder are composed of preferably preassembled units of interchangeable nature relatively free of parts having to be taken down or changed in the field. Such units and such traction devices are readily capable of being fabricated on a production basis and provide high strength, long-wearing and trouble-free endless shoe tracks for vehicles, carriages and other mobile equipment.

Other objects and advantages will be apparent from the following description and from the accompanying drawings, which are illustrative only, in which:

Figure 1 is a view in side elevation of two units connected together in one embodiment of a new traction device made in accordance with this invention;

Figure 2 is a view looking in the direction of line II—II of Figure 1, with parts broken away;

Figure 3 is a view taken along line III—III of Figure 2;

Figure 4 is a view taken along line IV—IV of Figure 1, with parts broken away;

Figure 5 is a view in side elevation of a schematic representation of a new traction device of this invention applied to a dual-tired tandem-wheeled vehicle;

Figure 10 is a view in side elevation of a modified embodiment of a traction device unit made in accordance with this invention;

Figure 11 is a plan view of the unit shown in Figure 10; and

Figure 12 is a view taken along line XII—XII of Figure 10, with parts broken away.

Figure 8:
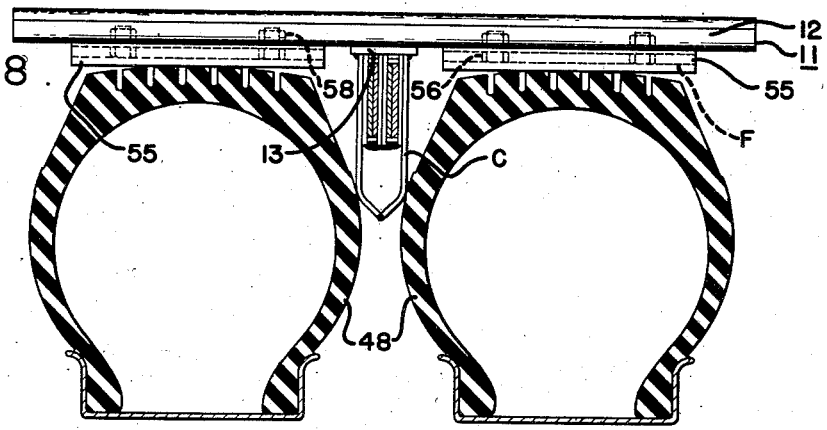
Figure 8 is a view, similar to the view shown in Figure 6, of still another form of an embodiment of a traction device made in accordance with this invention applied to a dual-tired vehicle.
Figure 6:
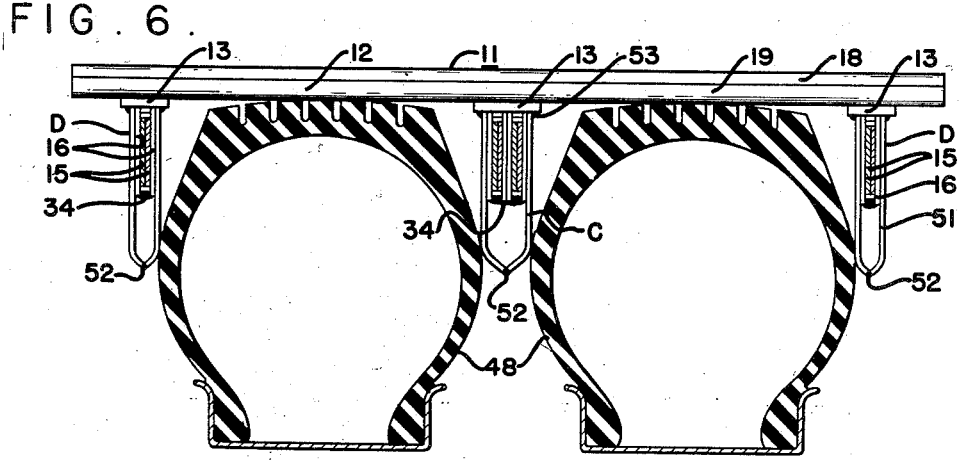
Figure 6 is a view taken along line VI—VI of Figure 5.

Referring to Figures 1 to 6 of the drawings, a new traction device 10 may be composed of a plurality of units 11 connected together in longitudinally extending endless order to provide traction shoes for a vehicle or other mobile equipment usually having tires around which such a traction device is mounted as shown, e. g., in Figure 5. Each unit 11 is preferably preassembled at a factory rather than in the field and comprises a transversely extending shoe 12, one or more mounting plates 13 in supported engagement with the top of shoe 12, a guide 14, one or more boxlike sheath connectors 15, one or more blade connectors 16 in horizontally interleaved relation to the aforesaid sheath connectors, and, a pivot pin 17 about which the connectors and shoe have limited relative articulation.

In the embodiment shown in Figure 1, shoe 12 is made up from a bottom channel section 18 and a top channel section 19 having their respective flanges 20 overlapped and welded to form a hollow rectangular transversely extending section, the ends of which may be left open. A central opening 21 is provided in section 19 and a piece of channel reinforcement 22 extending the height of the inside of shoe 12 may be welded as shown to the underside of section 19, the width of member 22 being somewhat greater than the width of opening 21. Top section 19 is provided with spaced openings 23 and bottom section 18 with spaced openings 24, whereby mounting plate 13 is secured to the top of shoe 12. Mounting plate 13 may be provided on its underside with downwardly extending studs 25 welded thereto, the spacing of the studs 25 being such as to pass through the openings 23 to be engaged by self-locking nuts 26 capable of being applied through the openings 24. If desired, spacing or lock washers 27 may also be used in holding mounting plate 13 rigidly to shoe 12. Mounting plate 13 is also provided with a central opening 28 in overlying relation to opening 21. There is such a central opening 28 in a mounting plate 13 and an underlying registering central opening 21 in section 19 for each of the guide-and-connector subassemblies, one or more laterally spaced from each other, that there may be in a particular unit 11.

Each sheath connector 15 comprises sides 29 and is generally trapezoidal in shape in side elevation, having a top edge 30 and a bottom edge 31. Edge 31 preferably is straight and adapted when adjoining units 11 are in alignment, as shown in the full line positions in Figure 1, to rest upon the top surfaces of adjoining mounting plates, edge 31 bridging the distance between adjoining units and shoes 12. Sides 29 are provided with a horizontal upper spacer 32 and a horizontal lower spacer 33, the outer faces of which are welded to the respective sides 29 so that the hollow interior of connector 15 will act as a sheath when a longitudinally aligned blade connector 16 of an adjoining unit 11 is inserted therein as shown in Figures 1 and 2. In the embodiment illustrated in those figures, each unit 11 has a pair of sheath connectors 15 in side-by-side arrangement which may be connected together by a weld metal deposit 34 and each such sheath connector 15 accommodates two blade connectors 16 also in side-by-side arrangements, the rigidly connected connectors of adjoining connected units being horizontally interleaved also. Although the terms "up," "down," "top," "bottom," "side-by-side," "fore and aft," "horizontal," "vertical," "transverse," "lateral" and "longitudinal" may be used herein, it will be understood that such terms are relative.

Blade connectors 16 are also generally trapezoidal in side elevation and are provided with a top edge 35 and a bottom edge 36, the distance between being the inside height between spacers 32 and 33. The sheath connectors 15 may be provided with a bolt hole 37 while the blade connectors 16 in each unit may be provided with bolt holes 38 transversely passing therethrough. Hence, when a set of blade connectors 16 of one unit are inserted in the sheath connectors 15 of another, one of the holes 38 is transversely aligned with bolt hole 37 and a bolt 39 and lock nut 40 used to lock the adjoining units 11 together as shown in Figure 1 with the preselected adjusted distance between them depending upon which of the holes 38 is used in making such union. It will be noted that the edges 35 and 36 are a close fit relative to the inside faces of the spacers 32 and 33 and respectively form a rigid connection when bolt 39 is so fastened in place.

In each unit 11, the respectively inner ends of the sheath connectors 15 are provided with downwardly projecting semi-circular ears 41 through which a transverse pivot passage 42 is drilled in registry. Likewise, the inner end of each blade connector 16 is provided with a downwardly projecting semi-circular ear 43 and also has a transverse pivot passage 44 therethrough in alignment with the pivot passages 42. The downwardly projecting ears 41 and 43 in each connector subassembly group in each unit extend through respective openings 21 and 28 into the interior of shoe 12 to provide a strong yet compact pivotal connection for that unit. The pivot pin 17, which may have a bushing sleeve thereover, if desired, extends through the passages 42 and 44 so that the respective blade connectors 16, or sheath connectors 15 on the same unit 11, or both, may articulate and turn about such pivot to the limited extent provided. The upper edge 35 of blade connector 16 may be notched at 45 and provided with an arcuate surface 46 which cooperates with the inner end 47 of the respective spacer 32 of the aligned sheath connector 15 on the same unit.

Hence, as shown on the right-hand side of Figure 1, assuming shoe 12 and sheath connector 15 are still horizontal, the left-hand unit 11 may turn upwardly enough to bring the blade connectors 16 of the right-hand unit 11 to the position shown by the dash-and-dot outline marked A until notches 45 abut ends 47 of the respective spacers 32 on such right-hand unit, such ends 47 passing over the circular arcs 46 in reaching that relative position. Conversely, if the right-hand unit 11 in Figure 1 has the shoe 12 and blade connectors 16 thereof horizontal, said connectors 15 of that right-hand unit 11 may be turned about the same pivot 17 until it assumes the position B shown in dash-and-dot outline with a stop being provided again between notches 45 and ends 47. Thus, there is limited articulation within each respective unit in a new traction device 10 relative to other units to take care of the bending of such device around the periphery of a tire or tires as shown in the illustrative case of dual-tires in tandem arrangement shown in Figures 5 and 6. The movement in each unit 11 occurs about the axis of its pivot 17 and is relative among the blade connectors 16, the sheath connectors 15 and the shoe 12 of that same unit, as the service and situation requires. In the case of a unit 11 rounding one of the tires 48 in Figure 5, each of the connectors may swing inwardly in its plane toward each other and away from mounting plate 13, with shoe 12 in somewhat flopping relation until mounting plate 13 and the shoe 12 are again in alignment with the bottom edge of the connectors on one or the other side, or on both sides, of pivot 17. However, the joined units 11, when in a straight line between the tires 48, cannot be bent in the other direction and will stay straight because of their construction even if they pass over a rock 49, thereby, for example, avoiding forces that might otherwise be detrimental and tend to pull axles 50 toward one another.

Guide 14 may be made of plate sides 51 bent toward one another at the top so as to be welded together at 52 leaving guide 14 open at its fore and aft ends and giving it an ogival appearance in end elevation. In side elevation, guide 14 in the embodiment shown is tapered in an upward direction. The bottom edges of guide 14 are welded at 53 to mounting plate 13. The center of the lower edge of each of the sides 51 is also provided with a semi-circular downwardly extending ear 54 having a pivot passage 55 therethrough in registry with passages 42 and 44. In the illustrated embodiment, the width of openings 21 and 28 is about equal to the length of pin 17 which thereby may be held in position by the same welding beads 53 as those which fasten guide 14 to mounting plate 13. If desired, mounting plate 13 may be dispensed with and guide 14 affixed directly to the top section 19 of shoe 12 with the respective connectors and pivot pin being held in the same manner as illustrated. The length of the openings 21 and 28 is such that the articulation above described about each pivot 17 may take place.

In assembling unit 11 of the illustrated form of the invention, the respective connectors 15 and 16 are placed back-to-back with their inner ends horizontally interleaved as shown and with pivot pin 17 in place. These parts are then positioned relative to a mounting plate 13 and a guide 14 placed thereover for welding of the subassembly together by means of the welding beads 53 whereupon the subassembly may be attached by studs 25 and nuts 26 to the previously preassembled shoe 12. Such units 11 may then, either in the factory or in the field, be made into the endless traction device such as endless tread 10 or other form of the invention for use. In applying an endless tread 10 to single or tandem tires, two adjoining links 11 are left unconnected until placed in position around such tire or tires on the vehicle whereupon the unconnected blade connector members 16 of one unit are inserted into the unconnected sheath connectors 15 of the adjoining unit and pulled together by any suitable draft means or tool until bolt 39 can be inserted and lock nut 40 applied thereto to close the traction device assembly on the vehicle where it is to serve.

In making up traction devices in accordance with this invention, the guide-and-connector subassemblies of a unit 11 are placed alongside, or between, as the case may be, the tire or tires which the new traction device is to serve. In unit 11, shown in Figure 6, the central guide-and-connector subassembly C has been fully described above and is the one shown in Figures 1 to 4, inclusive. Lighter outside guide-and-connector subassemblies D may be also provided in the embodiment form shown of unit 11 in Figure 6 and are constructed and operate in the same way with the difference being that each subassembly D has but a single sheath connector 15 and a pair of side-by-side blade connectors 16 cooperative therewith.

Figure 7:
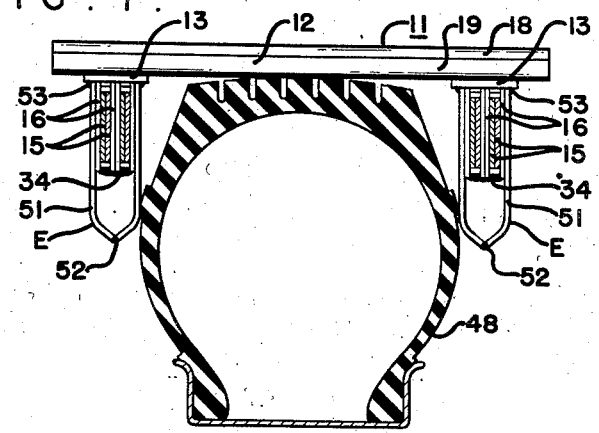
Figure 7 is a view, similar to the view shown in Figure 6, of another form of an embodiment of this invention applied to a single tire.
Figure 9:
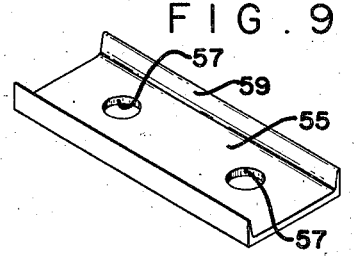
Figure 9 is a perspective view of a driving cleat used on the embodiment form shown in Figure 8.

Figure 7 illustrates a form of this invention having two guide-and-connector subassemblies E on either side of a single tire which may be on a tractor or other vehicle or mobile equipment and in single axle or in double or so-called tandem axle arrangement, as desired. The subassemblies E, as shown, are constructed and operate like the subassemblies C and D. In the case of a lighter duty, dual-tired vehicle, as shown in Figure 8, a traction device may employ a series of longitudinally aligned and connected units 11 having only a central guide-and-connector subassembly C therein between side-by-side tires 48. In the case of the form shown in Figure 8, driving cleats 55 are interposed between the tires 48 and the top of shoe 12, headed bolts 56 extending through the registering openings 57 in cleats 55 and corresponding openings in section 19 to be held in place by lock nuts 58, the flanges 59 of cleats 55 being upstanding and transverse to the direction of movement of the traction device 10. In some cold climates, where ice and snow might tend to pack between the flanges 59 of cleats 55, a rubber pad may be fastened to cleat 55 between flanges 59 to extend part way up from the bottom to the line F so that the resilience of the pad will tend to prevent such packing and any tendency to a resulting loss of traction between the tires 48 and cleats 55. It will be understood that cleats of other forms may be used in any of the various embodiments and forms of this invention.

The modification shown in Figures 10 to 12 correspond generally in structure and in functioning to the embodiment shown in Figures 1 to 4 and is provided with the same reference numerals with the addition of a prime factor thereto. In such modification, top section 19' has no central opening 21 because it is formed throughout its entire transverse length with a trough 60 therein extending to the bottom section 18' which eliminates the need for such a central opening or central openings or for any reinforcement like the member 22. Mounting plate 13' is, however, provided with a central opening 28' for each guide-and-connector subassembly in a particular unit 11' to accommodate the downwardly projecting ears of the connectors 15' and 16' and of the sides 51' of guide 14'. To each side of each central opening 28', the sides 61 of mounting plate 13' are depressed so that a pivot pin 17' may be inserted and removed as desired. As shown, pivot pin 17' has an enlarged head 62 adapted to fit against one of the sides of guide 14' when inserted in place and the other end is provided with a hole therethrough through which a cotter pin 63 may be inserted and have the ends spread to lock pin 17' in place, a lock washer 64 being preferably inserted between cotter pin 63 and the other side of guide 14'. Cleats 55' are shown in unit 11' with the outer corners thereof welded to the sides of trough 60 to hold such cleats firmly in place.

The modification shown in Figures 10 to 12 is also provided with grousers 65 in spaced skew arrangement across the bottom of shoe 12' for effective action regardless of which direction a track made up of units 11' may proceed. Indeed, tracks made in accordance with this invention are non-directional. As shown, each grouser 65 is recessed in the center and has a downwardly projecting ground gripping periphery 66 with a rib 67 at the top of the recessed portion. Grouser lug nuts 68 may be welded in the interior of shoe 12' above openings 69 through bottom section 18', such openings 69 being in registry with like openings through the ribs 67 of the respective grouser lugs. A headed bolt 70 is extended through the openings in the grouser lugs and openings 69 to engage the respective nuts 68, which are preferably lock nuts to secure the lugs 65 in place on the bottom of traction device units of this invention in instances when such grouser lugs are to be used. As shown, grouser lugs 65 are made of rubber with a steel plate insert 71 mounted therein for strength purposes although in many cases all metal grouser lugs will be preferred.

Various modifications may be made in aspects of this invention and other embodiments thereof are possible without departing from the spirit of my invention or the scope of the appended claims.

I claim:

1. In a unit for a traction device for a vehicle with tires or the like, said device comprising a plurality of such units pivotally connected in an endless order, in combination, a transversely extending shoe relatively rectangular in cross section having a channel bottom section and a spaced channel top section in overlapping fastened relation, said top section having a central opening, a mounting plate having a central opening in registry with said first-mentioned central opening and being in rigid supported engagement with the top of said shoe, means extending between said mounting plate and into the interior of said shoe to fasten said mounting plate to said shoe, a plurality of right and left grouser lugs in differentially skewed engagement with the bottom of said shoe and in respectively laterally spaced arrangement, means extending between said grouser lugs and the interior of said shoe to fasten said grouser lugs to said shoe, a longitudinally extending guide secured to said mounting plate, said guide being ogival in end elevation and tapering upwardly in side elevation, the sides of said guide being secured to said mounting plate fore and aft of said central opening, a plurality of longitudinally extending sheath connectors having their inner ends between the sides of said guide and their outer ends projecting longitudinally outwardly of said guide, the inner ends of said sheath connectors having a downwardly extending ear projecting through said central openings and into the interior of said shoe, a plurality of longitudinally extending blade connectors having their inner ends between the sides of said guide and their outer ends projecting longitudinally outwardly of said guide in a direction opposite to that of said sheath connectors, the inner ends of said blade connectors being respectively between the sides of the inner ends of said sheath connectors, said blade connectors having a downwardly extending ear projecting through said central openings into the interior of said shoe, a pivot passage extending in registry through the sides of said guides and said ears substantially in the plane of said central openings, a pivot pin extending through said pivot passage, means for holding said pin in said pivot passage with the inner ends of said respective connectors in horizontally interleaved relation for articulation relative to one another and to said shoe, cooperating means including an arcuate surface on the inner ends of said blade and sheath connectors to permit said articulation therebetween to a predetermined extent, means for limiting said articulation to arcs about said pivot extending upwardly from the plane of the top of said shoe toward the top of said guide for said respective connectors, means for transversely and rigidly binding blade connectors of an adjoining unit inserted in said sheath connectors and for adjusting the longitudinal extent of such insertion, the height of said blade connectors being equal to the height of the opening in said sheath connectors, and cleats having upstanding transverse edges connected to the top of said shoe offset from said guide.

2. In a unit for a traction device for a vehicle with tires or the like, said device comprising a plurality of such units pivotally connected in an endless order, in combination, a transversely extending shoe relatively rectangular in cross section having a channel bottom section and a spaced channel top section in overlapping fastened relation, said top section having a central opening, a mounting plate having a central opening in registry with said first-mentioned central opening and being in rigid supported engagement with the top of said shoe, means extending between said mounting plate and into the interior of said shoe to fasten said mounting plate to said shoe, a longitudinally extending guide secured to said mounting plate, said guide being ogival in end elevation and tapering upwardly in side elevation, the sides of said guide being secured to said mounting plate fore and aft of said central opening, a plurality of longitudinally extending sheath connectors having their inner ends between the sides of said guide and their outer ends projecting longitudinally outwardly of said guide, the inner ends of said sheath connectors having a downwardly extending ear projecting through said central openings and into the interior of said shoe, a plurality of longitudinally extending blade connectors having their inner ends between the sides of said guide and their outer ends projecting longitudinally outwardly of said guide in a direction opposite to that of said sheath connectors, the inner ends of said blade connectors being respectively between the sides of the inner ends of said sheath connectors, said blade connectors having a downwardly extending ear projecting through said central openings into the interior of said shoe, a transverse pivot pin extending through said ears, means for holding said pin in said ears with the inner ends of said respective connectors in horizontally interleaved relation for articulation relative to one another and to said shoe, cooperating means including an arcuate surface on the inner ends of said blade and sheath connectors to permit said articulation therebetween to a predetermined extent, means for limiting said articulation to arcs about said pivot extending upwardly from the plane of the top of said shoe toward the top of said guide for said respective connectors, and means for transversely and rigidly binding blade connectors of an adjoining unit inserted in said sheath connectors and for adjusting the longitudinal extent of such insertion, the height of said blade connectors being equal to the height of the opening in said sheath connectors.

3. In a unit for a traction device for a vehicle with tires or the like, said device comprising a plurality of such units pivotally connected in an endless order, in combination, a hollow transversely extending shoe having an opening in the top thereof, a mounting plate having an opening in registry with said first-mentioned opening and being in fixed engagement with said shoe, a longitudinally extending guide secured to said mounting plate, said guide being ogival in end elevation and tapering upwardly in side elevation, a longitudinally extending sheath connector having its inner end between the sides of said guide and its outer end projecting ouwardly of said guide, a longitudinally extending blade connector having its inner end between the sides of said guide and its outer end projecting outwardly of said guide in a direction opposite to that of said sheath connector, the inner end of said blade connector being respectively between the sides of the inner end of said sheath connector, said connectors having downwardly extending ears projecting through said openings into the interior of said shoe, a pivot passage extending in registry through the sides of said guide and of said ears, a pivot pin extending through said pivot passage, means for holding said pin in said pivot passage with the inner ends of said respective connectors in horizontally interleaved relation for articulation relative to one another and to said shoe, means including an arcuate surface on the inner end of one of said connectors to permit said articulation therebetween to a predetermined extent, means for limiting said articulation to arcs about said pivot extending upwardly from the plane of the top of said shoe toward the top of said guide for said respective connectors, means for inserting and securing said blade connector to a sheath connector of an adjoining unit, the height of said blade connector being equal to the internal height of a sheath connector.

4. In a unit for a traction device for a vehicle with tires or the like, said device comprising a plurality of such units pivotally connected in an endless order, in combination, a hollow transversely extending shoe having a reinforced opening in the top thereof, a mounting plate having an opening in registry with said first-mentioned opening and being in fixed engagement with said shoe, a longitudinally extending guide secured to said mounting plate, said guide being arched in end elevation and tapering upwardly in side elevation, a longitudinally extending sheath connector having its inner end between the sides of said guide and its outer end projecting outwardly of said guide, a longitudinally extending blade connector having its inner end between the sides of said guide and its outer end projecting outwardly of said guide in a direction opposite to that of said sheath connector, the inner end of said blade connector being respectively between the sides of the inner end of said sheath connector, said connectors having downwardly extending ears projecting through said openings into the interior of said shoe, a transverse pivot pin extending through said guide and of said ears, means for holding said pin in place with the inner ends of said respective connectors in horizontally interleaved relation for articulation relative to one another and to said shoe, means including an arcuate surface on the inner end of one of said connectors to permit said articulation therebetween to a predetermined extent, notch and spacer means for limiting said articulation to arcs about said pivot extending upwardly from the plane of the top of said shoe toward the top of said guide for said respective connectors, the bottom edge of said sheath connector being in extended contact with said mounting plate when both are horizontal, means for inserting and rigidly connecting at least one blade connector of one unit into a sheath connector of an adjoining unit to fit closely against the inside thereof.

5. In a unit for a traction device for a vehicle with tires or the like, said device comprising a plurality of such units pivotally connected in an endless order, in combination, a hollow transversely extending shoe having an opening in the top thereof, a longitudinally extending boxlike sheath connector having its inner end between the edges of said shoe and its outer end projecting outwardly of said shoe, the inner end of said sheath connector having an ear extending through said opening into the interior of said shoe, a longitudinally extending blade connector having its inner end between the edges of said shoe and its outer end projecting outwardly of said shoe in a direction opposite to that of said sheath connector, the inner end of said blade connector having an ear extending through said opening into the interior of said shoe, a pivot passage extending in registry through said ears generally midway between the transverse edges of said shoe, a pivot pin extending through said pivot passage, means for holding said pin in said pivot passage with the inner ends of said respective connectors in horizontally interleaved relation for articulation relative in to one another and to said shoe, means including a cut-out portion on the inner end of one of said connectors to permit said articulation therebetween to a predetermined extent, means for limiting said articulation to arcs about said pivot extending upwardly from the plane of the top of said shoe for said respective connectors, means for inserting said blade connector into a sheath connector of an adjoining unit, and means for rigidly connecting them together.

6. In a unit as set forth in claim 5, a transversely extending cleat of generally channel cross section having its edges upstanding, said cleat being fastened in position on the top of said shoe and to one side of said connectors.

7. In a unit as set forth in claim 5, a plurality of grouser lugs, said grouser lugs having a downwardly extending periphery surrounding an upwardly extending recess, said grouser lugs being respectively of right-hand and left-hand arrangement, and means in the interior of said shoe to cooperate with means extending into the respective recesses of said grouser lugs to affix the same to the bottom of said shoe in differentially angular arrangement.

8. In a traction device for a vehicle with tires or the like, in combination, a plurality of units pivotally connected in an endless order, a plurality of such units each having a hollow transversely extending shoe, a mounting plate in fixed engagement with the top of said shoe, a longitudinally extending hollow guide secured to said mounting plate, said guide being generally arched in end elevation, at least one longitudinally extending sheath connector having its inner end between the sides of said guide and its outer end projecting outwardly of said guide a length greater than the distance between adjoining shoes of adjoining units, the inner end of said sheath connector having an ear extending into the interior of said shoe centrally of the distance between the front and back thereof, at least one longitudinally extending blade connector having its inner end between the sides of said guide and its outer end projecting outwardly of said guide in a direction opposite to that of said sheath connector, the inner end of said blade connector being respectively between the sides of the inner end of said sheath connector, said blade connector having an ear extending alongside that of said sheath connector, a pivot pin extending transversely through said ears, means including an arcuate surface to provide limited articulation between and at the inner ends of said connectors relative to one another and to said shoe, and means for rigidly connecting together a blade connector of one unit inserted in a sheath connector of an adjoining unit to complete said traction device.

9. In a traction device for a vehicle with tires or the like, in combination, a plurality of units pivotally connected in an endless order, each unit having a transversely extending shoe, longitudinally extending guide plates with a smooth outer surface secured to said shoe, at least one longitudinally extending sheath connector having its inner end between said guide plates and its outer end projecting outwardly of said guide plates, the inner end of said sheath connector having an ear extending into the interior of said shoe centrally of the distance between the front and back thereof, at least one longitudinally extending blade connector having its inner end between said guide plates and its outer end projecting outwardly of said guide plates in a direction opposite to that of said sheath connector, the inner end of said blade connector being respectively against the side of the inner end of said sheath connector, said blade connector having an ear extending alongside that of said sheath connector, a removable pivot pin extending transversely through said ears, means including a cut-away edge to provide limited articulation between and at the inner ends of said connectors relative to one another, and adjustable means for rigidly connecting together a blade connector of one unit inserted in a sheath connector of an adjoining unit to complete said traction device, the internal cross section of said sheath connector having an integer ratio to the cross section of a blade connector and the same height.

10. In a traction device having a plurality of units pivotally connected in an endless order, in combination, a transversely extending shoe, a plurality of vertically extending connectors in horizontally interleaved adjoining relation, said respective connectors extending in opposite longitudinal directions, a pivot pivotally connecting said connectors to said shoe about midway between the front and back of said shoe, means to permit each of said connectors to flex about said pivot upwardly only from the top of said shoe to a predetermined extent, and a guide plate rigidly connected to said shoe respectively on the outside of said connectors, said guide plate extending above the top of said connectors.

No references cited.